(12) United States Patent
Chun et al.

(10) Patent No.: US 8,653,185 B2
(45) Date of Patent: Feb. 18, 2014

(54) METHOD OF FORMING IONICALLY-CHARGED, ENCAPSULATED COLORANT NANOPARTICLES

(75) Inventors: Doris Pik-Yiu Chun, Santa Clara, CA (US); Hou T. Ng, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 812 days.

(21) Appl. No.: 12/771,586

(22) Filed: Apr. 30, 2010

(65) Prior Publication Data
US 2011/0269901 A1 Nov. 3, 2011

(51) Int. Cl.
*C09D 11/10* (2006.01)
*C08G 18/08* (2006.01)

(52) U.S. Cl.
USPC ................... 524/590; 525/453; 525/454

(58) Field of Classification Search
None
See application file for complete search history.

(56) References Cited

U.S. PATENT DOCUMENTS

| | | | |
|---|---|---|---|
| 5,306,764 A * | 4/1994 | Chen | 524/591 |
| 7,071,242 B2 | 7/2006 | Flosbach et al. | |
| 7,352,502 B2 * | 4/2008 | Miyazaki et al. | 359/296 |
| 7,457,028 B2 | 11/2008 | Kanbe | |
| 7,522,333 B2 | 4/2009 | Yamamoto et al. | |
| 2009/0148384 A1 | 6/2009 | Fischer et al. | |

FOREIGN PATENT DOCUMENTS

EP 1605301 12/2005

OTHER PUBLICATIONS

English Abstract for JP 2007065235A, Mar. 15, 2007.*

* cited by examiner

*Primary Examiner* — Randy Gulakowski
*Assistant Examiner* — Jeffrey Washville

(57) ABSTRACT

A method of forming ionically-charged, colorant nanoparticles involves forming in-situ ionically-charged polyurethane monomers, and forming an emulsion including the ionically-charged polyurethane monomers and a colorant nanoparticle. The method further involves polymerizing or crosslinking the ionically-charged polyurethane monomers in the emulsion, where the polymerizing or crosslinking chemically attaches the ionically-charged polyurethane monomers to a surface of the colorant nanoparticle to form an ionically-charged encapsulation layer on the surface.

17 Claims, 12 Drawing Sheets

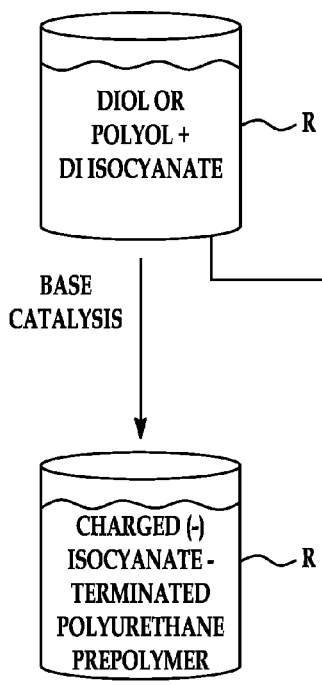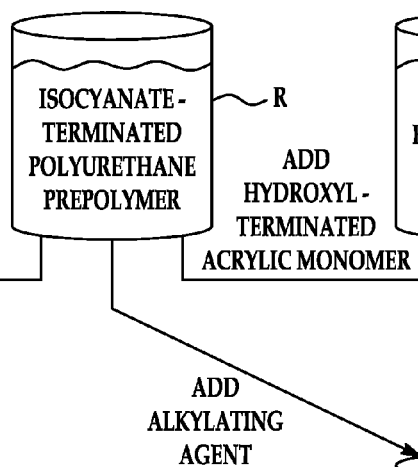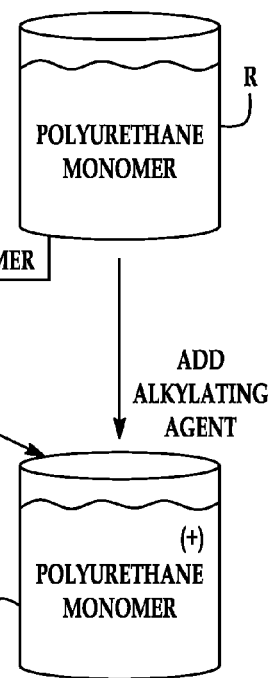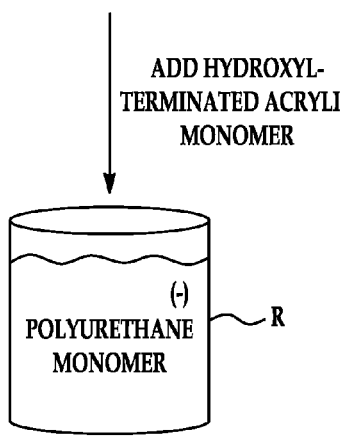

REACTION SCHEME (A)

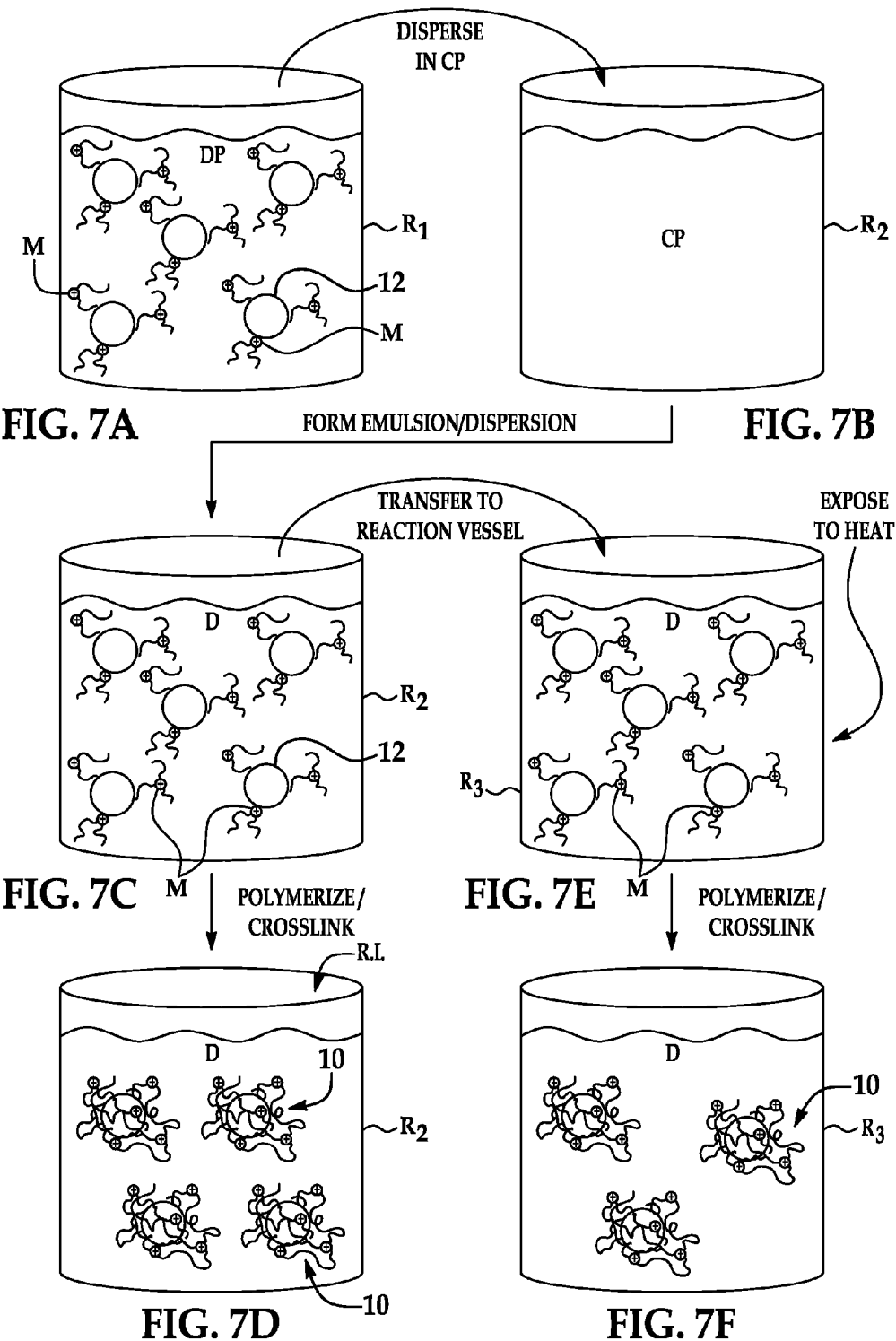

US 8,653,185 B2

METHOD OF FORMING IONICALLY-CHARGED, ENCAPSULATED COLORANT NANOPARTICLES

The present disclosure relates generally to methods of forming ionically-charged, encapsulated colorant nanoparticles.

Encapsulated particles have become increasingly useful in a variety of applications. Such applications include, but are not limited to, biological applications (e.g., drugs, cosmetics, etc.), printing applications (e.g., laser printing, digital commercial printing, etc.), and electronic applications (e.g., electronic inks, light emitting polymers, e-field displays, etc.).

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A, 3B and 3D together schematically depict an embodiment of a method of forming an embodiment of polyurethane cationomers;

FIGS. 3A through 3D together schematically depict another embodiment of a method of forming an embodiment of polyurethane cationomers;

FIGS. 3A, 3E, and 3F together schematically depict an embodiment of a method of forming an embodiment of polyurethane anionomers;

FIGS. 7A through 7D together schematically depict an embodiment of a method of forming an embodiment of ionically-charged, encapsulated nanoparticles; and FIGS. 7A, 7B, 7C, 7E, and 7F together schematically depict another embodiment of a method of forming another embodiment of ionically-charged, encapsulated nanoparticles.

DETAILED DESCRIPTION

Embodiment(s) of the method disclosed herein are advantageously used to produce ionically-charged, encapsulated colorant nanoparticles, where such nanoparticles may be utilized in printing applications (e.g., electrophotographic printing), in electric-field driven applications (e.g., liquid electrophotography and electronic displays), and/or the like. Each colorant nanoparticle includes a nanoparticle core that is encapsulated with an ionically-charged encapsulation layer that is chemically attached to the core. More specifically, positive or negative charges are formed by incorporating cationomers or anionomers into the encapsulation layer that is formed on the nanoparticle core. Due, at least in part, to the presence of such cationomers or anionomers in the nanoparticle encapsulation layer, ink compositions containing such colorant nanoparticles typically do not require additional dispersants and/or charge directors to promote or maintain dispersion stability. The ink compositions also exhibit enhanced physical properties including heat resistance, solvent resistance, print durability (such as, e.g., rub resistance, scratch resistance, waterfastness, highlight smearfastness, and handability), as well as improved adhesion to a media surface, which leads to improved media gamut.

Yet further, the ionically-charged, colorant nanoparticles have relatively uniform surface properties, which tend to reduce or substantially eliminate various undesirable printing effects (uneven gloss, etc.). Without being bound to any theory, it is believed that the uniform surface properties facilitate uniform development of the colorant particles on, e.g., the photo imaging plate (PIP) of a liquid electro printing (LEP) system or the photoconductor of an electrophotographic printing system, as well as unidirectional movement of the particles in electrophoretic displays. The uniform surface properties also allow for at least some flexibility in product design where multiple layers of colorants having various charges are required, such as, for example, for full-color non-emissive displays.

As used herein in some embodiments, the term prepolymer may be used to describe an intermediate product that is reacted with additional monomers or agents to form the charged polyurethane monomers. As used herein in other embodiments, the term prepolymer may be used synonymously with the term charged polyurethane monomers.

Figure 1:
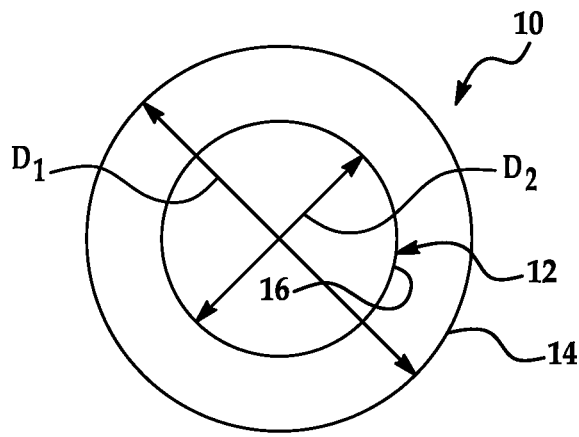
FIG. 1 schematically depicts an embodiment of an ionically-charged, encapsulated colorant nanoparticle.

An example of an ionically-charged, encapsulated nanoparticle 10 is schematically depicted in FIG. 1. The nanoparticle 10 generally includes a colorant nanoparticle core 12 having an ionically-charged encapsulation layer 14 chemically bonded to a surface 16 thereof. The ionically-charged encapsulation layer 14 includes ionically-charged polyurethane monomers that are polymerized or crosslinked onto the surface 16 of the nanoparticle core 14. In some instances, such polymerizing or crosslinking forms a continuous encapsulation layer that covers the entire surface 16 of the nanoparticle core 12. Such a continuous layer may be formed when the contact angle of the polymerized or crosslinked polyurethane monomers is less than 80 degrees. Without being bound by any theory, it is believed that this may be accomplished when the surface energy of the polyurethane monomers is substantially similar to that of the nanoparticle core 12. In other instances, the polymerizing or crosslinking forms a discontinuous encapsulation layer that covers various portions of the nanoparticle core 12. Such a discontinuous layer may be achieved, for example, when the surface energy of the polyurethane monomers is different than that of the nanoparticle core 12. As used herein, the surface energy of the monomers is considered to be different than that of the nanoparticle core 12 when the contact angle of the monomers on the nanoparticle core 12 is 80 degrees or more. In some cases, the contact angle of the polyurethane monomers and the nanoparticle core 12 ranges from about 80 degrees to about 100 degrees. In other cases, the contact angle ranges from about 80 degrees to about 90 degrees. In still other cases, the surface energies are considered to be significantly different when the contact angle of the monomer on the nanoparticle core 12 is greater than 100 degrees. Generally, a larger contact angle (and a larger difference between the nanoparticle surface energy and the monomer surface energy) corresponds with a more discontinuous encapsulation layer 14.

The encapsulation layer 14 (whether continuous or discontinuous) generally forms a shell that houses the nanoparticle core 12. As stated above, the layer 14 includes polymerized or crosslinked ionically-charged polyurethane monomers, where such monomers are chemically attached to the nanoparticle core 12. In some instances, such monomers are actually permanently attached to the nanoparticle core 12. It is to be understood that the term "permanent", as used in reference to the attachment of the monomers to the nanoparticle core 12, refers to non-reversible encapsulation of the nanoparticle core 12 with the polymerized or crosslinked polyurethane monomers (i.e., the ionically-charged encapsulation layer 14 permanently remains on the surface 16 of the nanoparticle core 12). The permanent attachment may be accomplished via covalent bonding when the ionically-charged polyurethane monomers chemically react with the nanoparticle 12. In other instances, the layer 14 may be considered to be a thermodynamically reversible coating such as, e.g., a layer produced by self-assembling processes. The polyurethane monomers may also or otherwise be attached to the nanoparticle core 12 through physical bonding (such as, e.g., through hydrogen bonding, Van der Waals interactions, Zwitterionic interactions, or the like).

The nanoparticle core 12 (i.e., the non-encapsulated colorant nanoparticle) is formed from any suitable solid nanoparticle including, but not limited to, colorants (e.g., organic pigments, inorganic pigments, or dyes), quantum dots, colloidal particles (e.g., metal colloids), or combinations thereof. The nanoparticle core 12 is also spherically/substantially spherically shaped, where such particle has an initial size (i.e., diameter) $D_2$ ranging from about 1 nm to about 250 nm. Although the average size $D_2$ of the nanoparticle core 12 is, e.g., about 150 nm, it is to be understood that the size of the nanoparticle core 12 depends, at least in part, on the material selected for such particle. Further, the size $D_1$ of the encapsulated nanoparticle 10 (i.e., the nanoparticle core 12 having the ionically-charged encapsulation layer 14 formed thereon) ranges from about 50 nm to about 1 μm. In another example, the size $D_1$ of the encapsulated nanoparticle 10 ranges from about 100 nm to about 500 nm.

Examples of organic or inorganic pigment particles may be selected from, but are not limited to, black pigment particles, yellow pigment particles, magenta pigment particles, red pigment particles, cyan pigment particles, blue pigment particles, green pigment particles, orange pigment particles, brown pigment particles, and white pigment particles. In some instances, the organic or inorganic pigment particles may include spot-color or specialty pigment particles. Spot-color pigments are formed from a combination of a pre-defined ratio of two or more primary color pigment particles. Specialty pigments may, e.g., be metallic, fluorescent and/or opalescent pigments.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Some non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Non-limiting examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

In another embodiment, the pigment may be selected from metallic pigments, examples of which include, but are not limited to, a metal selected from gold, silver, platinum, nickel, chromium, tin, zinc, indium, titanium, copper, aluminum, and alloys of any of these metals. These metals may be used alone or in combinations with two or more metals or metal alloys. Non-limiting examples of metallic pigments include Standard RO100, Standard RO200, and DORADO PX™ 4001 (available from Eckart Effect Pigments, Wesel, Germany).

In yet another embodiment, the pigment may be selected from a pearlescent pigment (also known as an opalescent pigment), which are pigments that tend to exhibit various colors depending on the angle of illumination and/or of viewing. Non-limiting examples of pearlescent pigments include those of the PRESTIGE® series and of the DORADO PX™ series, both of which are available from Eckart Effect Pigments.

Some non-limiting examples of dyes that may be used include fluorescein, rhodamine, nigrosine, and napthol green.

Figure 2:
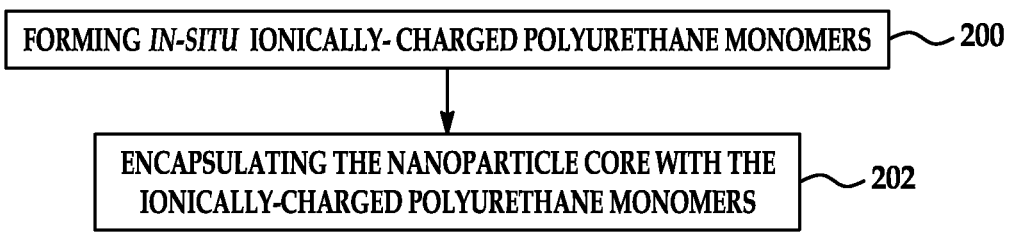
FIG. 2 is a flow diagram depicting an embodiment of a method of forming an embodiment of ionically-charged, encapsulated colorant nanoparticles.

An example of a method for forming ionically-charged, encapsulated colorant nanoparticle 10 is generally depicted in FIG. 2. Such method includes forming in-situ ionically-charged polyurethane monomers (as shown by reference numeral 200), and then encapsulating the nanoparticle core 12 with the ionically-charged polyurethane monomers (as shown by reference numeral 202).

The ionically-charged polyurethane monomers are used as an emulsifying synergist that aids in the encapsulation of the colorant nanoparticle core 12. When the encapsulated nanoparticle 10 is used as a colorant in an ink composition, such monomers assist in achieving dispersion stability. More specifically, since the monomers are charged and include a polymeric segment, the monomers may be very similar in structure to polymeric dispersants and/or surfactants that are typically used in ink formulations to promote stability. As such, use of the charged monomers in the ink formulation obviates the need for additional dispersants to accomplish such stability. Furthermore, the localized charges in the encapsulation layer 14 formed on the nanoparticle core 12 also enable the colorant nanoparticle 10 to act as a charge director. As such, an ink composition including the colorant nanoparticles 10 does not have to include a separate charge director.

In an embodiment, the ionically-charged polyurethane monomers are formed in-situ (for instance, in a single container), and the process for forming such monomers depends, at least in part, on whether such monomers are positively or negatively charged. An example of a method for forming positively charged polyurethane monomers (referred to herein as polyurethane cationomers) is shown in FIGS. 3A through 3D, while an example for forming negatively charged polyurethane monomers (referred to herein as polyurethane anionomers) is shown in FIGS. 3A, 3E, and 3F.

Referring now to the example depicted in FIGS. 3A through 3D, polyurethane cationomers are formed by reacting, in a single reactor R, a diol or polyol with a diisocyanate to form an isocyanate-terminated polyurethane prepolymer (shown in FIGS. 3A and 3B). The ratio of diol or polyol to diisocyante is about 1:2, depending upon the materials selected and the desirable cationomer to be formed (discussed further in reference to FIGS. 4A through 4C). In one embodiment, the diisocyanate is introduced into the reactor R, and then the diol or polyol is added to the diisocyanate via, e.g., an addition funnel over a predetermined time period. It is to be understood that ratio of diol or polyol to diisocyanate may be more or less than 1:2 because the diol or polyol is added to the diisocyante to maximize formation of the condensed intermediate (i.e., the prepolymer shown in FIG. 3B). In a non-limiting example, the time period ranges from about 3 hours to about 6 hours. This time period may vary depending upon the materials used. The reaction shown taking place in FIGS. 3A and 3B may take place in an inert atmosphere at a temperature ranging from about 50° C. to about 70° C. In a non-limiting example, this reaction takes place at a temperature of about 60° C.

In the foregoing example and as briefly mentioned above, the diol or polyol is added to the diisocyanate to maximize the formation of the condensed form of the intermediate (e.g., the polyurethane prepolymer). The polyurethane prepolymer intermediate formed by adding the diol or the polyol to the diisocyanate includes isocyanate groups located at terminals ends of the prepolymer. For instance, diethanol amine may be added to the diisocyanate in the reactor R (shown in FIG. 3A) so that the diethanol amine reacts with excess isocyanates in the reactor R to cap both ends of the alcohol. This is shown, e.g., in the reaction scheme (A) depicted in FIG. 4A.

It is to be understood that the order in which the reactants are added dictates, in part, the type of intermediate that is formed. For example, if the diisocyanate is added to an excess of the diol or the polyol already present in the reactor R (rather than the other way around as described above), the ends of the diisocyanate are capped. This is shown, e.g., in row (1) of the reaction scheme (C) in FIG. 4C. This intermediate is a macro-diol or a macro-polyol. It is to be further understood that, in some instances, the rate of the addition of the reactants (in addition to the order in which the reactants are added) also dictates the type of intermediate or product that is formed. The rate may be determined by monitoring the consumption of the reactant being introduced into the reactor R. This may be accomplished, for example, using various techniques known in the art, such as, e.g., thin layer chromatography (TLC) and high performance liquid chromatography (HPLC). Routine control over the addition rate enables control over the formation of one intermediate or product over another intermediate or product.

To form positively-charged polyurethane monomers, the diol or polyol starting material is generally selected from a base, and may be selected from a variety of bi-functional molecules (i.e., containing two free hydroxyl groups) or tri-functional molecules (i.e., containing more than two free hydroxyl groups). As will be discussed in further detail below at least in conjunction with FIG. 4A, bi-functional molecules (e.g., diols) may be selected so that the resultant polyurethane monomers individually include two crosslinking sites so that, upon polymerization or crosslinking, the monomers are capable of chain extension. As will also be discussed in further detail below at least in conjunction with FIG. 4B, tri-functional molecules (e.g., triols) may be selected so that the resultant polyurethane monomers individually include at least three crosslinking sites (also referred to herein as multiple crosslinking sites) so that such monomers are capable of high density networking upon polymerization or crosslinking.

Non-limiting examples of suitable bi-functional molecules include ethylene glycols, alkane-diols, N,N'-bis-(2-hydroxypropylaniline) (DHPA), 1,4-di-(2-hydroxyethyl) hydroquinone (HQEE), dialcohol-amines, two hydroxyl group-containing polyols (such as, e.g., polypropylene glycols (PPGs), polyethylene glycols (PEGs), polyester polyols, aliphatic polyester polyols, polycaprolactone polyols, aromatic polyester polyols, polytetramethylene ether glycols, castor oil based polyols, and acrylic polyols), hydroxyl terminated polybutadienes, and/or combinations thereof. Non-limiting examples of tri-functional molecules include glycerine, trimethylolpropane, triethanol-amine, pentaerythritol, sorbitol, sucrose, polyols having more than two free hydroxyl groups, and/or combinations thereof.

The diisocyanate may be selected from any suitable diisocyanate. Some non-limiting examples of suitable diisocyanates include the isomeric forms of the following: toluene diisocyanate (TDI), diphenylmethane diisocyanate (MDI), hexamethylene diisocyanate (HDI), isophorone diisocyanate (IPDI), m-tetramethylxylene diisocyanate (m-TMXDI), dicyclohexylmethane 4,4'-diisocyanate (HMDI), and/or combinations thereof. In another example, the diisocyanate may be selected from any isocyanate-terminated prepolymers that are commercially available, examples of which include the VERSATHANE® series and the AIRTHANE® series (both from Air Products and Chemicals, Inc., Allentown, Pa.).

Referring now to FIGS. 3B and 3C, a hydroxyl terminated acrylic monomer is then introduced into the reactor R that contains the isocyanate-terminated polyurethane prepolymers produced by the step depicted in FIGS. 3A and 3B. Non-limiting examples of such hydroxyl terminated acrylic monomers include hydroxyethyl acrylate (HEA) or hydroxyethyl methacrylate (HEMA). Such hydroxyl terminated acrylic monomers are allowed to react with the isocyanate-terminated polyurethane prepolymers to form a polyurethane-based di-(meth)acrylate monomer. In an example, upon complete/substantially complete (e.g., 95% or more) consumption of the diisocyanate during the reaction shown in FIGS. 3A and 3B, the hydroxyl terminated acrylic monomers are added to the reactor R dropwise in the presence of stirring over a predetermined period of time. In a non-limiting example, the addition of the hydroxyl terminated acrylic monomers and the stirring is accomplished for about 1 hour. The mixture may be allowed to react at a temperature ranging from about 70° C. to about 90° C. until all of the hydroxyl terminated acrylic monomers are consumed. Base titration may be used, in some instances, to determine the completeness of the reaction.

It is to be understood that the reaction that takes place during the step depicted in FIGS. 3B and 3C yields uncharged polyurethane monomers. Such monomers may thereafter be positively charged (i.e., to become cationomers) by introducing an alkylating agent into the reactor R (as shown in FIGS. 3C and 3D). Such an alkylating agent may be selected from halomethanes (e.g., methyl iodide, methyl chloride, methyl bromide, or the like) and dimethyl sulfates. Generally, the choice of the alkylating agent determines the counter ion (e.g., $I^-$, $Cl^-$, $Br^-$, $(H_3CO)SO_3^-$ etc.) that will be associated with the cationomer when formed. The alkylating agent reacts with the polyurethane-based di-(meth)acrylate to impart a cationic charge (depicted as a (+) sign in FIG. 3D) to the polyurethane monomer.

In another embodiment, hydroxyl-terminated acrylic monomers are not added to the isocyanate-terminated polyurethane prepolymer formed in FIG. 3B. In this embodiment, an alkylating agent is added directly to the prepolymer (shown in FIG. 3B), to form the positively-charged polyurethane monomer (shown in FIG. 3D). This reaction results in isocyanate-terminated positively charged polyurethane monomers.

Figure 4A:
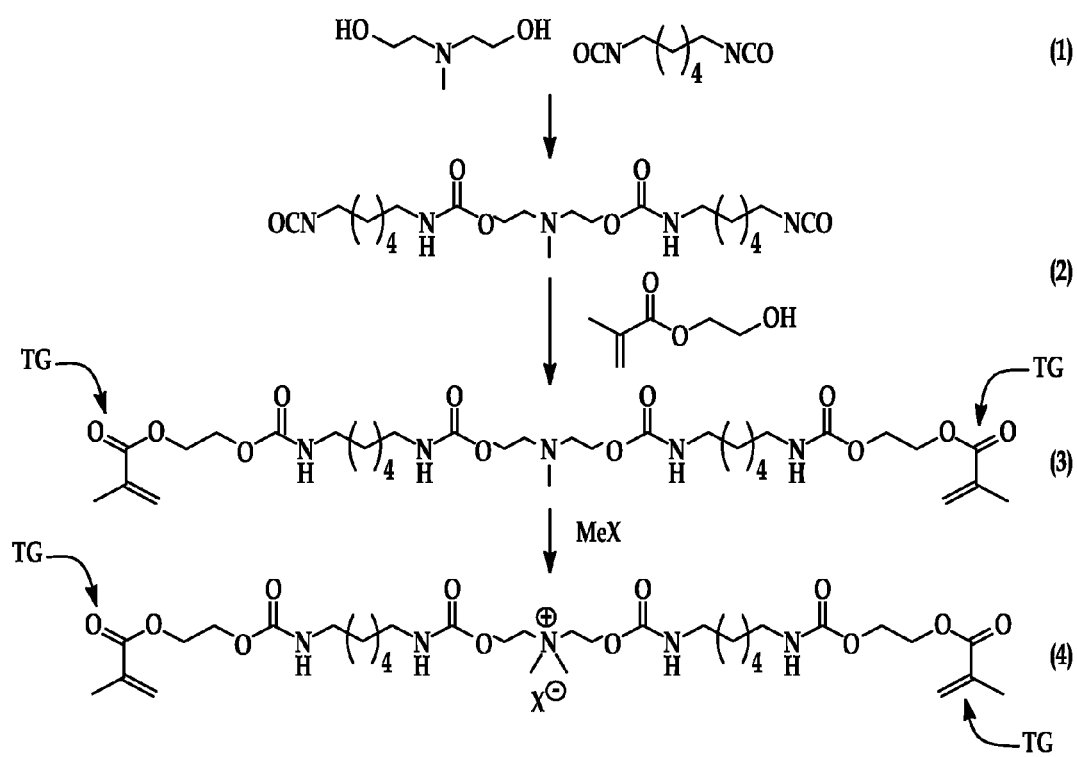
FIGS. 4A through 4C are reaction schemes illustrating the formation of various embodiments of the polyurethane cationomers.
Figure 4B:
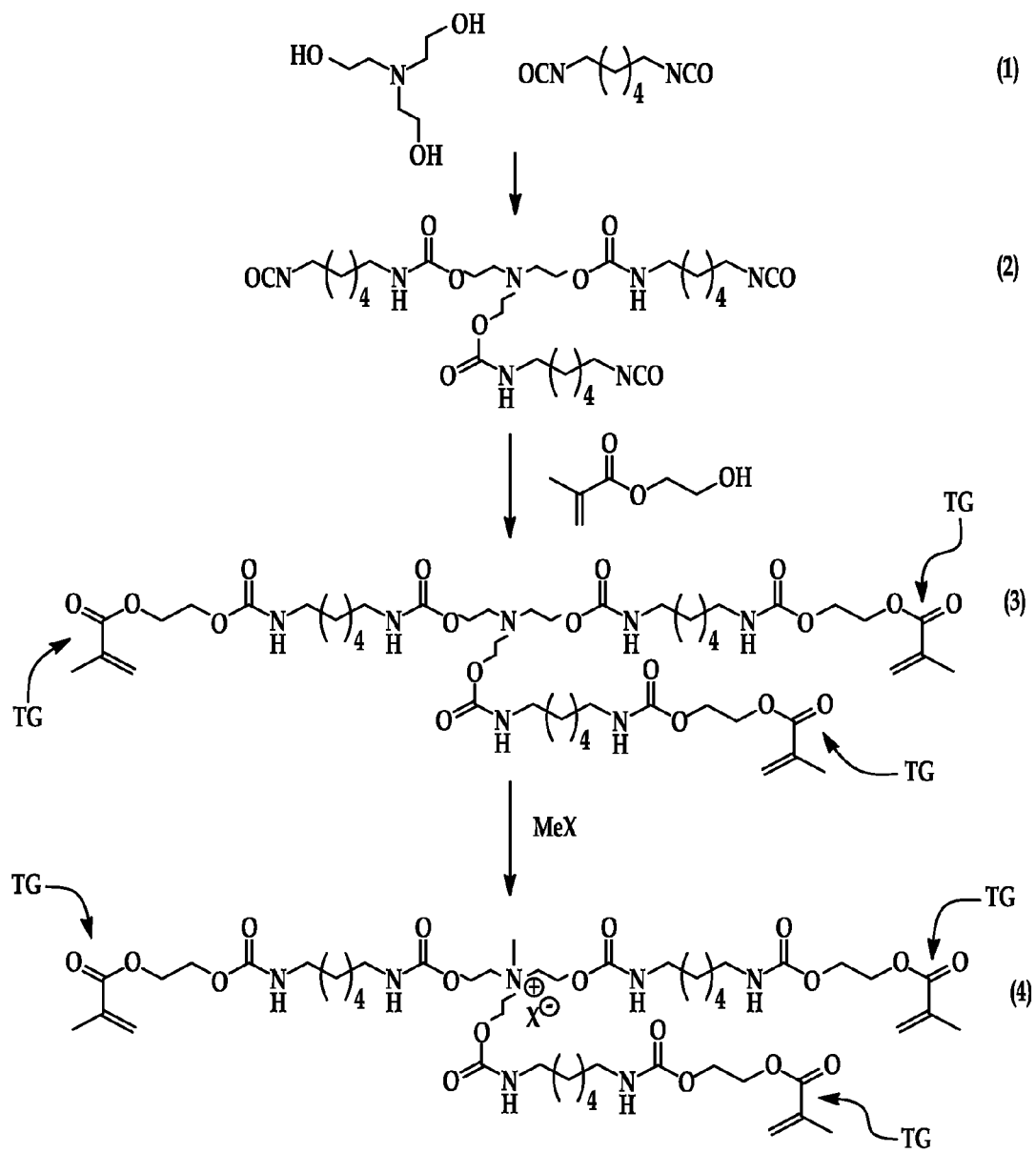
Figure 4C:
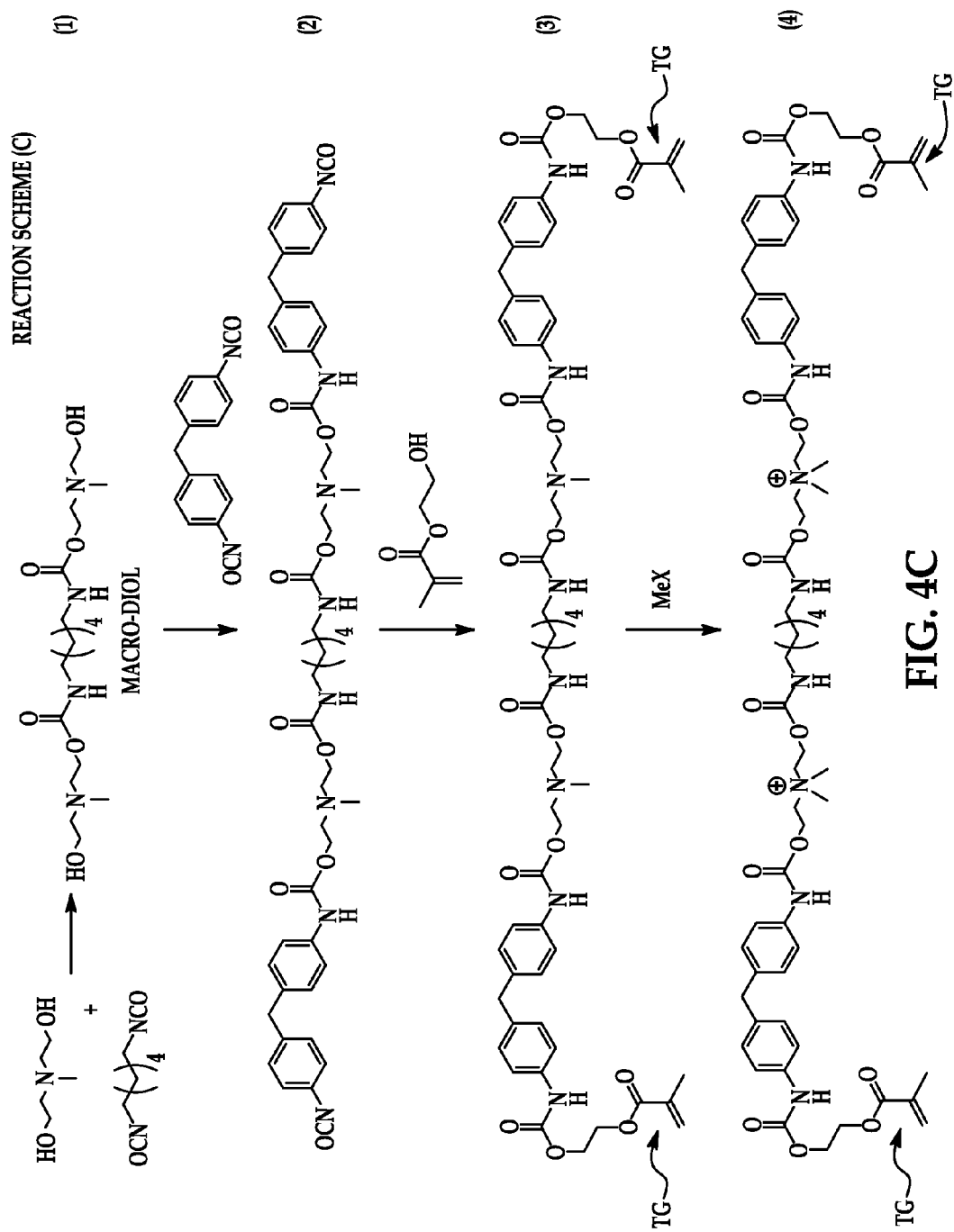

More specific non-limiting examples of forming polyurethane cationomers are depicted in reaction schemes (A) through (C) in FIGS. 4A through 4C, respectively. Such reaction schemes are provided herein to demonstrate i) how polyurethane cationomers are formed, and ii) how to tune or alter such polyurethane cationomers during their formation. In an example, the structure of the polyurethane cationomer may be altered to achieve a desired crosslinking or polymerization behavior. This may be accomplished by controlling the reaction stoichiometry and/or the selection of starting materials (i.e., the bi- or tri-functional molecules and the diisocyanate).

Reaction scheme (A) depicted in FIG. 4A is an example of the synthesis of a crosslinkable polyurethane (meth)acrylic cationomer that includes two crosslinking sites, and is therefore capable of chain extension (i.e., linear growth) upon crosslinking or polymerization. In sequence (1) of this reaction scheme (A), a diol (e.g., 0.1 mole of N-methyl-diethanol amine) is selected as the bi-functional molecule starting material, and such material reacts with a diisocyanate of choice (e.g., 0.2 moles of hexamethylene diisocyanate) to yield an isocyanate-terminated polyurethane prepolymer (shown by sequence (2) in FIG. 4A). The isocyanate-terminated polyurethane prepolymer (which may be referred to herein as a macro-diisocyanate) reacts with hydroxyl-terminated (meth)acrylic monomers (such as the previously mentioned hydroxyethyl methacrylate or hydroxylethyl acrylate) to form a di(meth)acrylate including two equivalent, terminal groups (identified by reference character TG) and a tertiary amine (see sequence (3) in FIG. 4A). The di(meth)acrylate is thereafter treated with an alkylating agent (identified in FIG. 4A as MeX), where such alkylating agent converts the center tertiary amine group to a quaternary amine group bearing a permanent positive charge (shown by sequence (4) in FIG. 4A). The terminal groups TG are capable of crosslinking to linearly extend the cationomer.

It is to be understood that the bi-functional molecule and diisocyanate selected for reaction scheme (A) also directly affect the physical properties of the polyurethane monomers when such monomers are polymerized or crosslinked onto the nanoparticle core 12. Examples of such physical properties may include solvent resistance, elasticity, durability, and film forming ability to name a few. For instance, the selection of a linear diol may contribute to elastomeric properties of the polymerized or crosslinked polyurethane monomer, whereas selection of an aromatic or an alkane for the polyol may increase solvent resistance and/or durability.

It is further to be understood that the type of cation imparted to the polyurethane monomer depends, at least in part, on the type of alkylating agent selected to react with the di(meth)acrylate in sequence (4) of FIG. 4A. The selection of the alkylating agent contributes to the strength and/or charge of the resultant cationomer. For example, a cationomer bearing a single positive charge (i.e., a +1 charge) may be obtained by reacting methyl iodide (where the methyl group bears a single positive charge, and the iodide bears a single negative charge) with the di(meth)acrylate.

In another example, the polyurethane cationomer may be formed so that the resulting cationomer includes multiple crosslinking sites (i.e., three or more crosslinking sites). This type of cationomer is capable of forming a high density network (i.e., where the number of crosslinks or repeating units of the polymer makes up more than about 30% of the cationomer) upon crosslinking or polymerization. The formation of this type of cationomer may be accomplished, for instance, by selecting a starting material exhibiting tri-functionality, such as, e.g., a triol (e.g., triethanolamine (TEA)), as shown in the reaction scheme (B) in FIG. 4B. In reaction scheme (B), the triol reacts with the diisocyanate (e.g., hexamethylene diisocyanate) to form the isocyanate-terminated polyurethane prepolymer (shown at sequence (2) in FIG. 4B). The isocyanate-terminated polyurethane prepolymer is then allowed to react with hydroxyl-terminated (meth)acrylic monomers to form a di(meth)acrylate including three equivalent terminal groups TG and a tertiary amine (shown at sequence (3) in FIG. 4B). The di(meth)acrylate is treated with an alkylating agent (MeX) to convert the center tertiary amine group to a quaternary amine group including a permanent positive charge (shown by sequence (4) in FIG. 4B).

The resultant cationomer structure includes three crosslinking sites TG, and such crosslinking sites are arranged such that the cationomer can react in more than one dimension upon polymerization or crosslinking. Such multi-dimensional crosslinking or polymerization enables the cationomer to form crosslinked networks as opposed to linear chains alone (as is possible with the cationomer formed by the reaction scheme (A) in FIG. 4A). It is to be understood that the encapsulation layer 14 formed from multi-dimensional crosslinked networks tends to be tougher than those with linear crosslinked chains alone. The multi-dimensional crosslinkable cationomers also tend to improve the strength and/or durability of the encapsulation layer 14 formed therefrom.

In yet another example, the strength of the polyurethane cationomer may be controlled by altering the amount of the bi- or tri-functional molecule used as the starting material, which changes the stoichiometry of the bi- or tri-functional molecule and the diisocyanate starting materials. Controlling the strength of the cationomers in this manner may be referred to herein as "charge directing," an example of which is shown by reaction scheme (C) depicted in FIG. 4C. In this particular reaction scheme, a diol reacts with a diisocyanate to form a macro-diol (shown by sequence (1) in FIG. 4C). The macro-diol is formed because the amount of diol used is at least twice as much as the amount of diisocyanate used. It is to be understood that, in this example, the amount of the diol should exceed that of the diisocyanate to ensure that all of the diisocyanate is consumed during the reaction, which typically reduces the amount of by-products formed. In one specific example, the macro-diol is formed by reacting two equivalents of the diol with one equivalent of the diisocyanate. Without being bound to any theory, the use of the macro-diol for the synthesis of the cationomer increases the number of cations per polyurethane monomer formed. The increased concentration of ions (in this instance, cations) per monomer increases the ionic strength of the monomer.

As shown at sequences (2) and (3) in FIG. 4C, the macro-diol is reacted with another diisocyanate to form an isocyanate-terminated polyurethane prepolymer (sequence (2)), and then the isocyanate-terminated polyurethane prepolymer reacts with hydroxyl-terminated (meth)acrylic monomers to form a di(meth)acrylate including two equivalent terminal groups TG (sequence (3)), and two tertiary amine groups. The di(meth)acrylate is treated with an alkylating agent (MeX) to convert the two tertiary amine groups to quaternary amine groups, each of which carries a positive charge (shown by sequence (4) in FIG. 4C).

It is to be understood that the cationomer structure may be controlled using methods other than as described above in order to achieve other desirable properties. For instance, the diisocyanate may be selected from a material that exhibits similar chemical structure(s)/functional group(s) as the nanoparticle core 12 such that encapsulation of the polyurethane cationomer on the core 12 is more favorable. In an example, the nanoparticle core 12 may include benzene in its chemical structure, and thus the diisocyanate may be selected from a material also having benzene rings (such as, e.g., the diisocyanate selected for the reaction scheme (C) depicted in FIG. 4C).

Referring back to the FIG. 3 series, FIGS. 3A, 3E and 3F depict an example of a method for forming polyurethane anionomers. The anionomers may be formed in a similar manner to the previously described cationomers except that i) the bi- or multi-functional molecule is selected from an acid which acts as a hydroxylating agent for the formed prepolymer, and ii) uses base (e.g., amine) catalysis to impart an anionic charge to the prepolymer, and thus also to the resultant monomer structure. Non-limiting examples of acidic bi- or multi-functional molecules include dimethylol propionic acid, dihydroxybenzoic acid and isomers thereof, and dihydroxylterephthalic acid.

In an example, the polyurethane anionomers are formed in-situ by reacting, in the single reactor R, the acidic bi- or multi-functional molecules with a diisocyanate to form an isocyanate-terminated polyurethane prepolymer (shown in FIG. 3A). The ratio of the acidic bi- or multi-functional molecule to diisocyanate or diisocyanate to acidic bi- or multi-functional molecule is 1:2. When the acidic molecule is present in excess, the isocyanate ends will be capped, and when the isocyanate is in excess, the OH ends of the acidic molecule will be capped. In one embodiment, the reactor R is dried and purged with an inert gas, and then the acidic molecules are introduced into the reactor R. The acidic molecules are allowed to react with diisocyanate at a temperature ranging from about 50° C. to about 70° C. for a predetermined time. In a non-limiting example, the predetermined time ranges from about 1 hour to about 12 hours. In another non-limiting example, the predetermined time ranges from about 3 hours to about 6 hours. This reaction (in which the acidic molecules is added to the diisocyanate) yields an isocyanate-capped prepolymer (see FIG. 3E).

In this embodiment, the reaction shown in FIG. 3A is catalyzed using any suitable base, such as trialkylated amines (e.g., triethylamine), or non-nucleophilic bases (e.g., potassium t-butoxide and lithium diisopropylamide), or other suitable bases. This will deprotonate the acid group(s) of the formed prepolymer. It is to be understood that the base may be used in excess to ensure deprotonation of all acidic sites. The charge(s) are generated as a result of forming a more stable conjugate weak acid. The base catalyzed reaction also generates a cation, such as a triethylammonium cation that is present with the charged prepolymer. The result of the catalyzed reaction is a charged isocyanate-capped prepolymer, as shown in FIG. 3E.

As previously mentioned, however, a charged OH-capped prepolymer (e.g., a macro-diol or macro-polyol) may be formed when the acidic molecule is present in the reactor R in excess and the diisocyanate is added thereto and then base catalysis is initiated. The macro-diol or polyol may then be reacted with another diisocyanate to form an isocyanate-terminated polyurethane prepolymer.

Referring to FIGS. 3E and 3F, a hydroxyl terminated acrylic monomer is introduced into the reactor R that contains the charged isocyanate-capped polyurethane prepolymers produced by the base catalyzed reaction depicted in FIGS. 3A and 3B. Non-limiting examples of such hydroxyl terminated acrylic monomers include hydroxyethyl acrylate (HEA) or hydroxyethyl methacrylate (HEMA). Such hydroxyl terminated acrylic monomers are allowed to react with the charged isocyanate-capped prepolymer to form a charged polyurethane-based di-(meth)acrylate monomer. In an example, upon complete/substantially complete (e.g., 95% or more) consumption of the diisocyanate during the reaction shown in FIG. 3E, the hydroxyl terminated acrylic monomers are added to the reactor R dropwise in the presence of stirring over time (using the parameters and conditions described above for forming the cationomers). It is to be understood that the addition of the hydroxyl terminated acrylic monomer may be removed from the method (i.e., perform step shown in FIG. 3A and base catalysis) if it is desirable to form an isocyanate-capped polyurethane prepolymer/monomer.

While not shown in FIG. 3F, it is to be understood that the positively charged triethylammonium ion (or another cation depending upon the base used) is present with the negatively charged polyurethane monomer. Ion exchange may be performed to replace the cations with other suitable cations (e.g., $Na^+$, $K^+$, and $H^+$). It is to be understood that multivalent cations (e.g., $Ca^{+2}$) may also be used to replace the former cations during the ion exchange. The use of multivalent cations may cause complexation of the ionomer, which ultimately leads to at least one more degree of crosslinking. Ion exchange may be accomplished, in one embodiment, by passing the mixture through suitable ion-exchange resin columns.

It is to be understood that the diol or polyol and the diisocyanate may be added together to form an uncharged prepolymer, and then, if desirable, the hydroxyl terminated acrylic monomers may be introduced into the reactor R to form an uncharged polyurethane monomer. In this embodiment, base catalysis is performed after formation of the monomer to introduce the negative charge to the monomer.

Figure 5A:
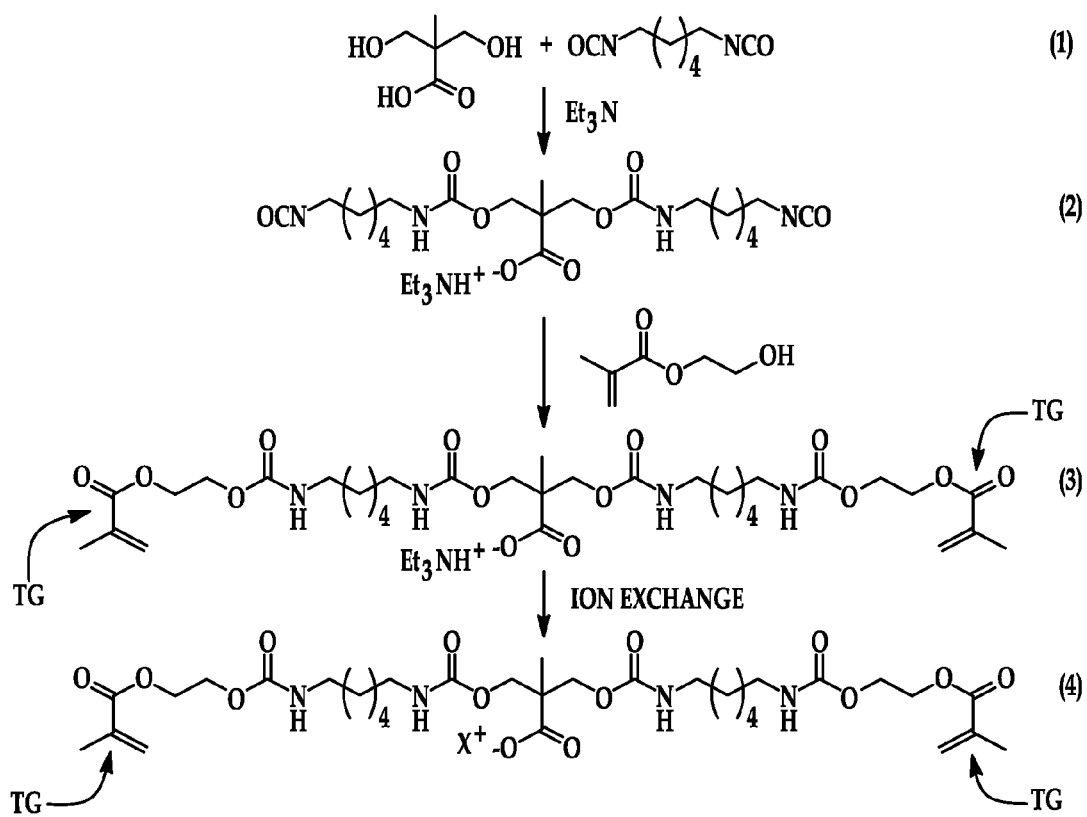
FIGS. 5A through 5C are reaction schemes illustrating the formation of various embodiments of polyurethane anionomers.
Figure 5B:
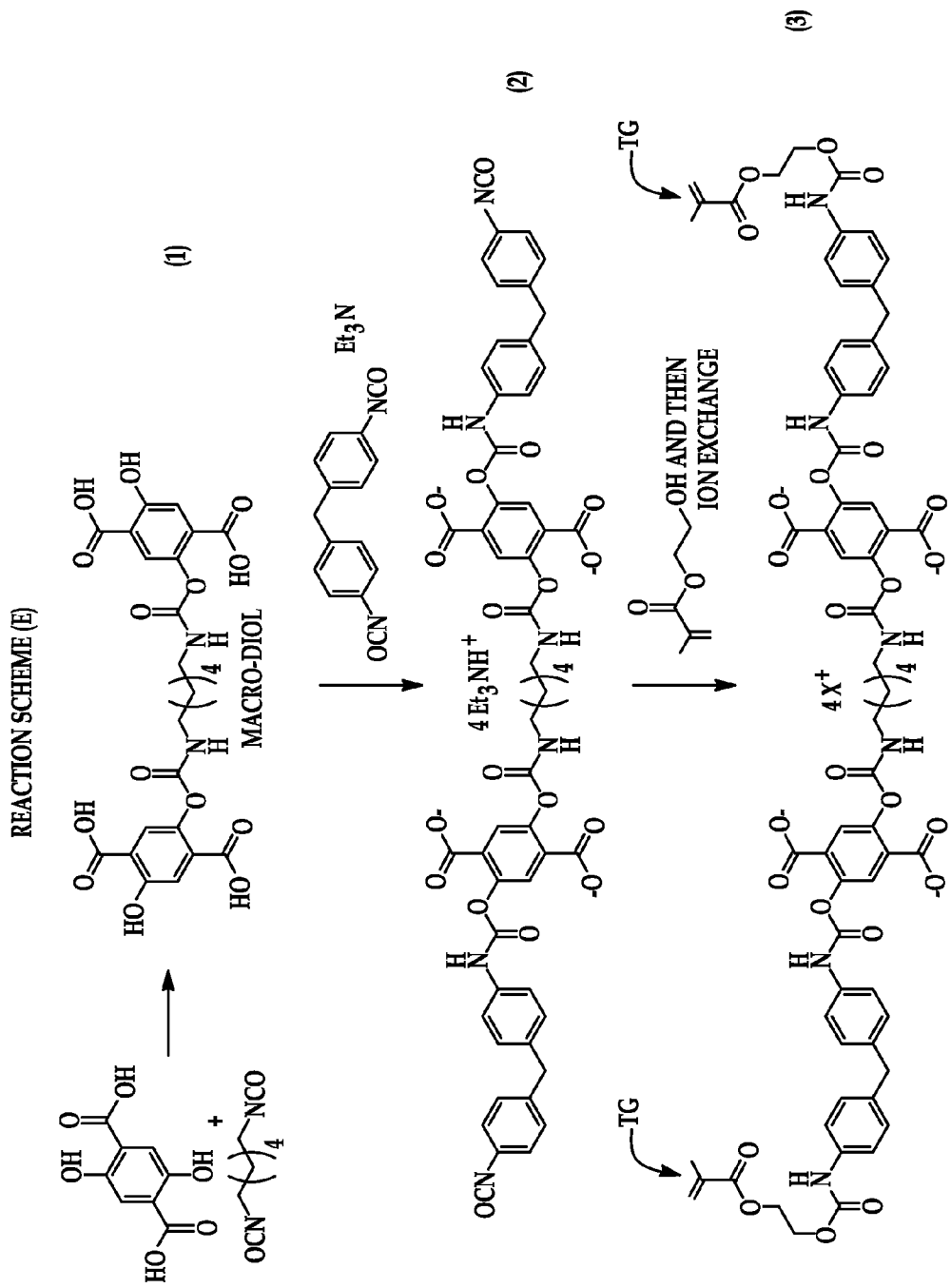
Figure 5C:
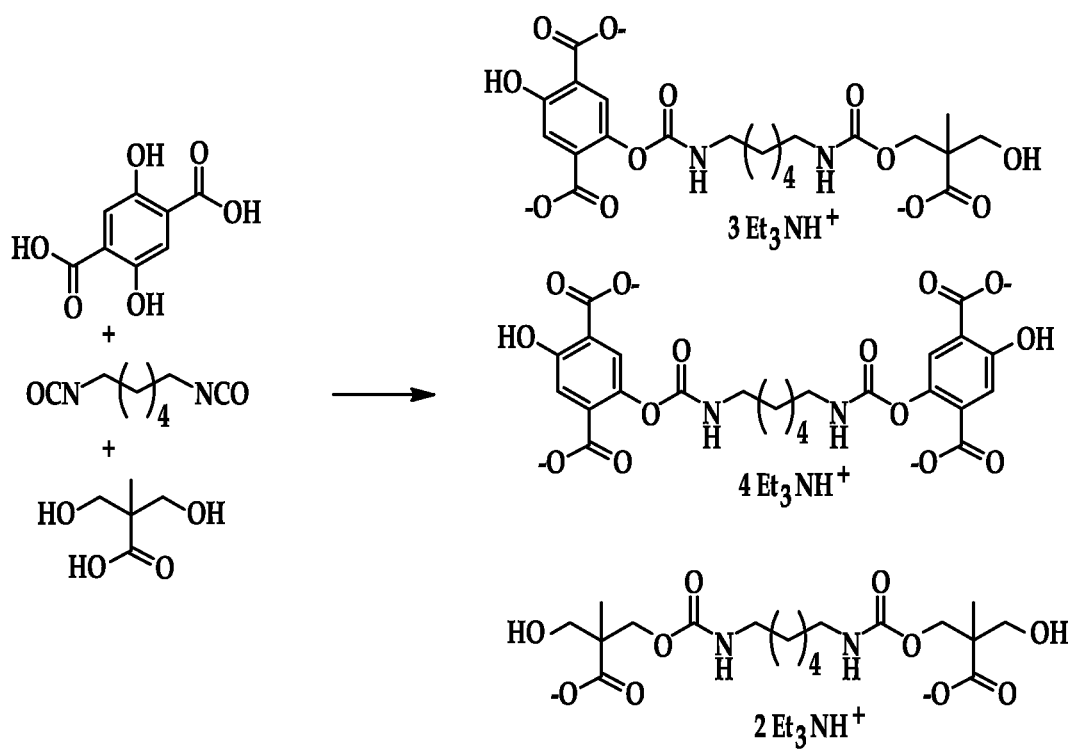

Examples of forming polyurethane anionomers are depicted in reaction schemes (1) through (3) in FIGS. 5A through 5C, respectively. Such reaction schemes are provided herein to demonstrate i) how polyurethane anionomers are formed, and ii) how to tune or alter such anionomers during such formation. Similar to that described above for cationomers, the polyurethane anionomer may also be altered to achieve a desired crosslinking or polymerization behavior. Such is accomplished, for example, by altering the stoichiometry of the starting materials, or by selecting particular starting materials that will directly affect the resulting anionomer structure.

Reaction scheme (D) depicted in FIG. 5A is an example of a synthesis for forming a crosslinkable polyurethane anionomer that includes two crosslinking sites TG and a single negative charge. In this reaction scheme, an acidic diol is selected as the bi-functional starting material (e.g., dimethylol proprionic acid). This acidic diol reacts with a diisocyanate of choice (e.g., hexamethylene diisocyanate, as shown by sequence (1) in FIG. 5A). This reaction is catalyzed by the addition of a strong base (also referred to herein as base catalysis) such as a trialkylated amine (such as, e.g., triethylamine ($Et_3N$)). Other examples of strong bases that may be used include, but are not limited to, non-nucleophilic bases such as potassium t-butoxide and lithium diisopropylamide. Typically, the strong base will be added in excess (e.g., in three equivalents) to deprotonate all of the acidic groups or sites of the prepolymer. Such a catalyzed reaction yields a negatively charged isocyanate-capped polyurethane prepolymer and a positively charged ion (e.g., triethylammonium ion, as shown by sequence (2) in FIG. 5A).

The charged isocyanate-capped prepolymer is then reacted with hydroxyl-terminated acrylic or methacrylic monomers (e.g., hydroxyethyl acrylate (HEA) or hydroxyethyl methacrylate (HEMA)) to form diacrylate or dimethacrylate urethane monomers including two equivalent, terminal groups TG. The monomers may be passed through ion-exchange columns to replace the triethylammonium ($Et_3NH^+$) ions with a cation of choice (e.g., $Na^+$) (as shown in sequence (4) in FIG. 5A).

Similar to the methods for forming the cationomers discussed above, the number of crosslinking sites and/or the number of ionic groups present in the anionomers may be altered based on the selection of the bi- or multi-functional molecules and/or the diisocyanate used as starting materials for the synthesis. In an example, the acid diol may be replaced with an acid-bearing polyol so that the number of crosslinking sites of the resultant anionomer structure increases proportionally according to the number of free OH groups in the acid-bearing polyol. If, on the other hand, the acid diol is replaced with a diacid diol such as, e.g., dihydroxylterephthalic acid, then the number of negative charges increases. Additionally, the anion concentration or strength may be controlled by altering the stoichiometry of the starting materials (i.e., use two equivalents of acid diol or polyol and one equivalent of the diisocyanate) to form a macro-diol or a macro-polyol (see reaction scheme (E), FIG. 5B).

In reaction scheme (E), a tetra-anionic crosslinkable polyurethane prepolymer is formed by reacting two equivalents of a diacid diol (e.g., 2,5-dihydroxyterephthalic acid) with one equivalent of diisocyanate of choice (e.g., hexamethylene diisocyanate) to form a macro-diol (shown at sequence (1) in FIG. 5B). The macro-diol is reacted with another diisocyanate (e.g., dicyclohexylmethane 4,4'-diisocyanate) in the presence of a trialkylated amine (e.g., $Et_3N$) catalyst to form a charged isocyanate-terminated or capped polyurethane prepolymer (shown by reaction sequence (2) in FIG. 5B) bearing four negative charges and four triethylammonium ions ($Et_3NH^+$).

As illustrated at sequence (3) in FIG. 5B, the charged isocyanate-capped prepolymer is then reacted with hydroxyl-terminated acrylic or methacrylic monomers (e.g., hydroxyethyl methacrylate) to form the dimethacrylate urethane monomers including two equivalent, terminal groups TG. Also as illustrated at sequence (3) in FIG. 5B, the monomers may be passed through ion-exchange columns to replace the triethylammonium ($Et_3NH^+$) ions with any desirable cations (e.g., $Na^+$).

It is further to be understood that the polyurethane anionomers may also be formed via a combinatorial synthesis. Such a synthesis involves using different acid bi- or multi-functional molecules in the initial step, which gives rise to a final composition including different anionomers. For instance, as shown in the reaction sequence (F) in FIG. 5C, two different acid diols (e.g., 2,5-dihydroxyterephthalic acid and dimethylol proprionic acid) may be used as starting materials, and such diols are reacted with any desirable diisocyanate (e.g., hexamethylene diisocyanate) and subjected to base catalysis to generate the negatively charged product. Such starting materials may yield three different macro-diols. These three macro-diols may then be reacted with another diisocyanate to form three different polyurethane anionomers. It is to be understood that such a combinatorial synthesis may also be modified to produce three different polyurethane cationomers (e.g., using the starting materials and similar process described in FIGS. 3A through 3D and 4A through 4C).

It is to be understood that the reaction schemes depicted in FIGS. 4A through 4C and 5A through 5C for forming polyurethane cationomers and anionomers, respectively, may be accomplished in the absence of moisture. Performing the syntheses in the absence of moisture is desirable because water tends to be reactive toward isocyanate, and hydroxyl groups from the water actively participate in the reaction to form a by-product that ultimately becomes polyurea. Further, the reaction between water and isocyanate can be highly exothermic at elevated temperatures and can form carbon dioxide gas. This may be undesirable, and thus the reaction schemes can be performed in the absence of moisture (i.e., in an inert atmosphere). Furthermore, when the moisture content is low (e.g., less than about 100 ppm), the reaction between the isocyanate and the hydroxide dominates, which minimizes or even eliminates any accumulation of carbon dioxide gas.

Figure 6A:
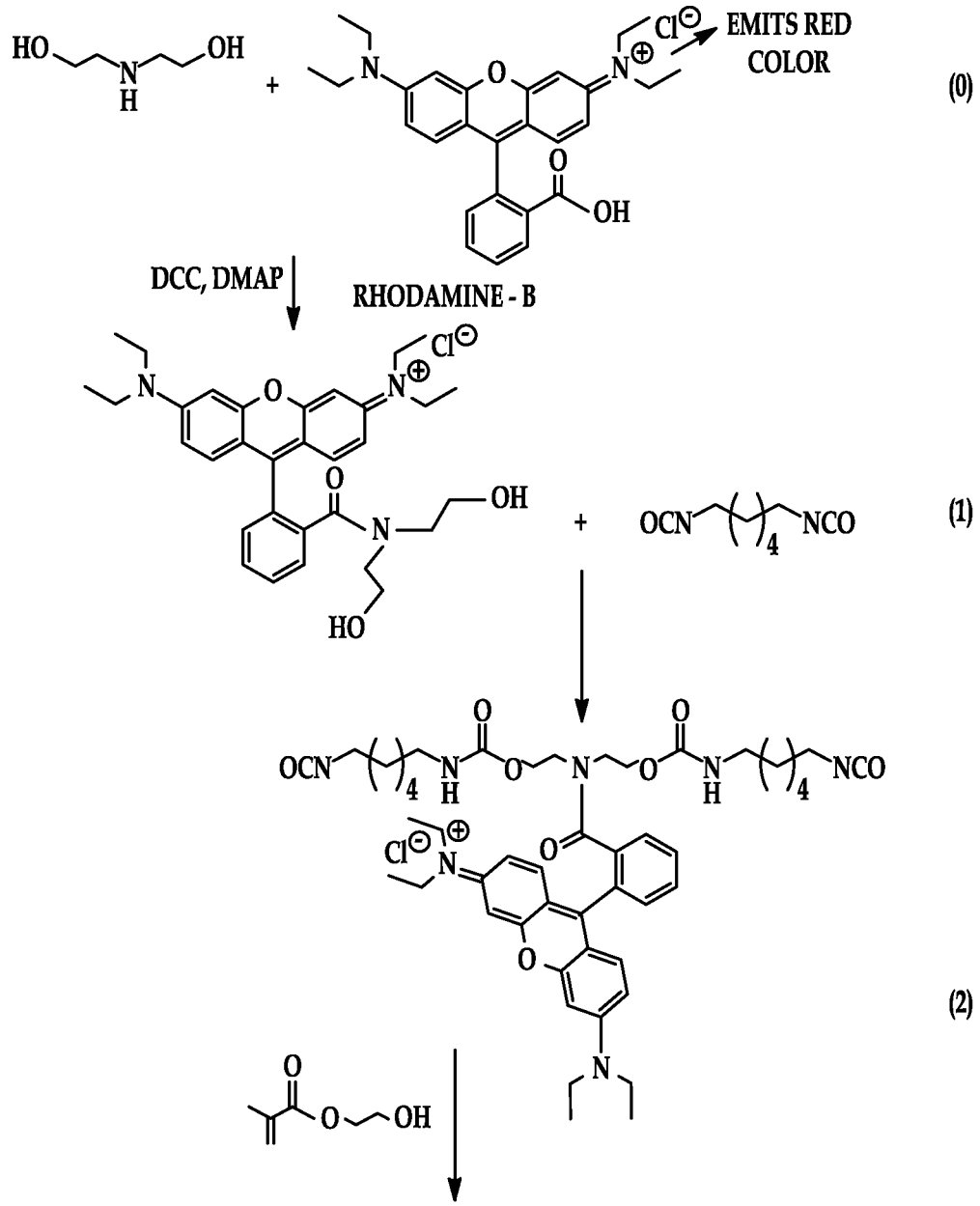
FIG. 6A is a reaction scheme of an embodiment of a method of forming an embodiment of a tagged polyurethane cationomer.
Figure 6A:
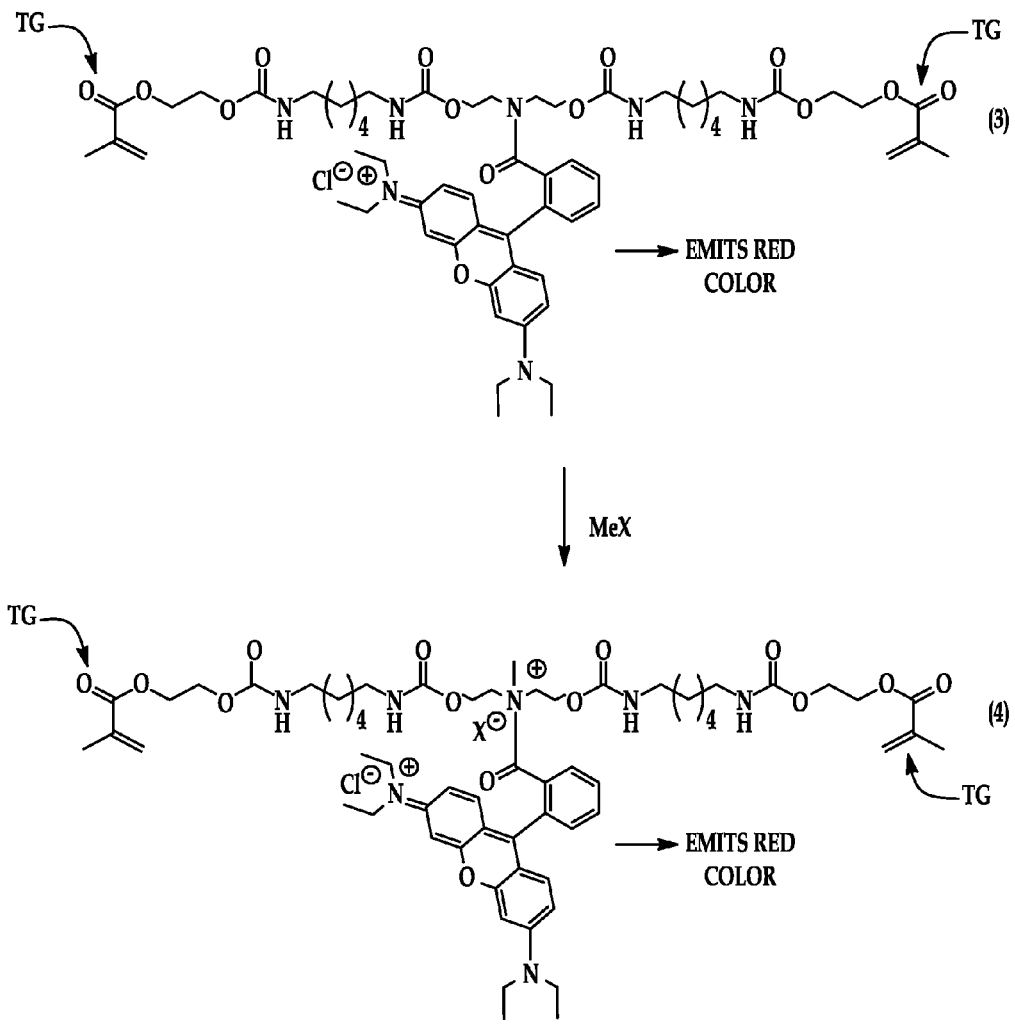

In an example, any of the cationomers or anionomers formed by the embodiments/examples described herein may be tethered with a tag (such as, e.g., a fluorescent marker or the like), where such tag may be detectable by a suitable fluorescent detector. Such tags may advantageously be used for tracing and/or detecting the presence of the cationomer or anionomer that is chemically attached to the nanoparticle core 12. An example reaction scheme for forming a tagged cationomer is shown in FIG. 6A. This reaction scheme (labeled reaction scheme (A')) is substantially identical to reaction scheme (A) depicted in FIG. 4A, except that the diol reacts with a tag in an initial reaction sequence (0). More specifically, as shown in FIG. 6A, the diol reacts with the tag rhodamine B in the presence of dicyclohexyl carbodiimide (DCC) and dimethylamino pyridine (DMAP) (which are standard peptide coupling reagents) to produce a diol tagged with the rhodamine B. It is to be understood that the foregoing reaction may also take place in the presence of other reagents such as, e.g., N,N'-diisopropylcarbodiimide (DIC), 1-Hydroxybenzotriazole anhydrous (HOBt), and DMAP. Generally, to tag the diol (or polyol), an amount of the tag used is about 1 wt % of the total weight percent of the diol (or polyol) used. In an example, about 10 g of the diol reacts with about 1 g of the tag to produce the tagged diol. The tagged diol may then be used in the reaction scheme (A') in the same manner as the diol is used in the reaction scheme (A) shown in FIG. 4A, but the cationomer formed by reaction scheme (A') (shown in reaction sequence (4) of FIG. 6A) is capable of fluorescing (in this case, emitting a red color) when exposed to a suitable stimulus (e.g., light, heat, etc.).

Figure 6B:
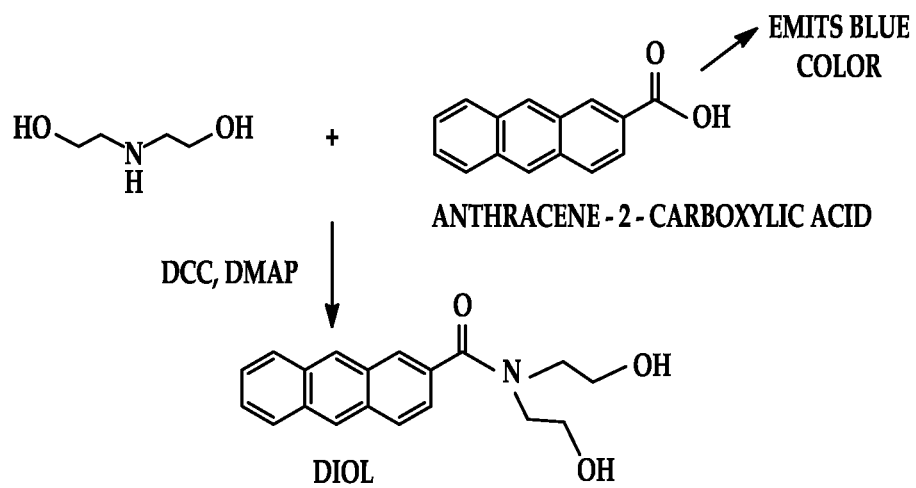
FIGS. 6B and 6C are reaction schemes for forming embodiments of respective tagged diols for use in forming embodiments of tagged polyurethane cationomers.
Figure 6C:
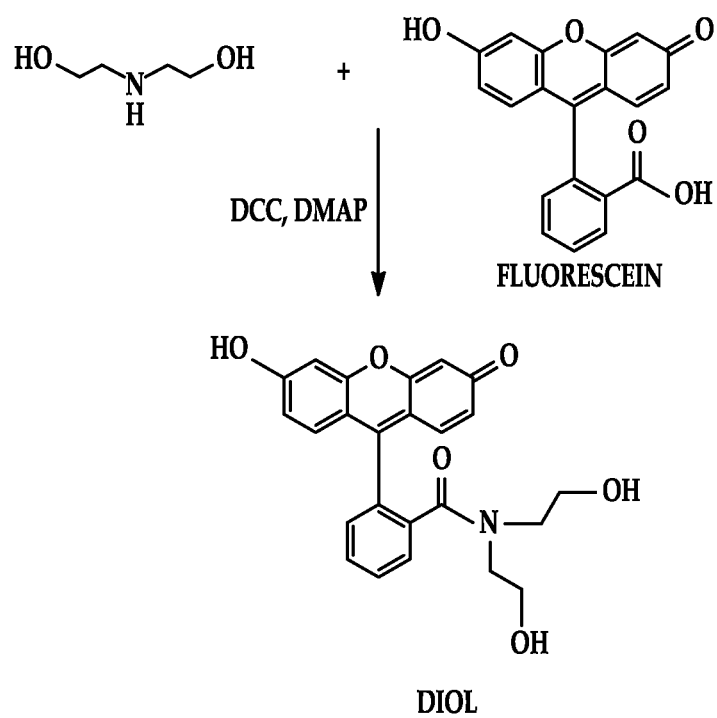

Other examples of tags for forming cationomers include anthracene-2-carboxylic acid (as shown in FIG. 6B), fluorescein (as shown in FIG. 6C), or any other molecule including a carboxylic group. These tags may be attached to the diol (or polyol) in the same manner that is shown in FIG. 6A, and the tagged diol may then be used to form a tagged cationomer (as also shown in FIG. 6A). It is to be understood that any tag including an amine group (non-limiting examples of which include rhodamine B amine, 2-amino-anthracene, etc.) may be used in a similar manner described in reference to FIG. 6A to form tagged acidic diols or polyols and then tagged anionomers. It is to be understood that an amount of the amine group-containing tag is about 1 wt % of the total weight percent of the acid diol (or polyol) used to form the anionomer. The tagged acidic diol or polyol may then be used, for example, in the reaction scheme (D) shown in FIG. 5A, but the anionomer formed is capable of fluorescing when exposed to a suitable stimulus (e.g., light, heat, etc.).

Referring back to FIG. 2, once the ionically-charged, polyurethane monomers are formed, the nanoparticle core 12 may be encapsulated with the ionically-charged, polyurethane monomers. Encapsulation of the nanoparticle core 12 may be accomplished via water-based encapsulation or non-water-based encapsulation (such as, e.g., encapsulation that is hydrocarbon-based, oil-based, or the like). Furthermore, such encapsulation may be accomplished with or without a polymerization or crosslinking initiator. Examples of the encapsulation method are described in detail below in conjunction with the FIG. 7 series.

In an embodiment, water-based encapsulation may be accomplished when the nanoparticle core 12 selected is hydrophobic. Such encapsulation may be accomplished by forming an emulsion including the ionically-charged polyurethane monomers and the hydrophobic nanoparticle cores 12. For instance, the ionically-charged polyurethane monomers (identified by reference character M) are mixed with the nanoparticle cores 12 in a reactor $R_1$ to form a discontinuous phase DP (shown in FIG. 7A). In an example, the nanoparticle cores 12 may be selected from those having a surface charge that is opposite of that of the monomers M. As such, if the monomers M are embodiments of the cationomers disclosed herein, negatively charged nanoparticles cores 12 may be selected. Conversely, if the monomers M are embodiments of the anionomers disclosed herein, positively charged nanoparticles cores 12 may be selected. In the example shown in FIG. 7A, each nanoparticle core 12 has a negatively-charged functional group on its surface (such as, e.g., sulfonated copper phthalocyanine (CuPc) pigments, or pigments having terminal carboxylic groups attached thereto, or the like), and such nanoparticles 12 are mixed with polyurethane cationomers M. The mixture contains, for example, a nanoparticle-to-monomer ratio ranging from about 1:1 to about 1:10. In another example, the nanoparticle-to-monomer ratio is about 1:2. As one specific non-limiting example, 10 grams of nanoparticle pigments may be used with 20 grams of polyurethane monomers M.

The discontinuous phase DP is dispersed into a continuous phase CP (shown in reactor $R_2$) to form the emulsion or dispersion D (shown in FIGS. 7B and 7C). Creating the emulsion or dispersion D may be accomplished, for example, by introducing the discontinuous phase DP into the other reactor $R_2$, where such other reactor $R_2$ contains the continuous phase CP. The continuous phase CP may include, for instance, a polar solvent and at least one surfactant. In a non-limiting example, the discontinuous phase DP containing 10 grams of the nanoparticle cores 12 and 20 grams of polyurethane monomers M is dispersed in about 300 g of the polar solvent containing from about 1 g to about 30 g of surfactant(s). It is to be understood that the amount of surfactants used is adjusted depending upon the amount of polyurethane ionomer used. In one embodiment, the amount of surfactant ranges from 0.02 wt % to about 10 wt % of the total weight percent of polyurethane ionomer used. For instance, if the total amount of polyurethane ionomers is about 100 g, then the amount of surfactant(s) used ranges from about 0.02 g to about 10 g.

In an example, the polar solvent may be selected from water alone. It is to be understood that in one embodiment water is not mixed with another polar solvent because such other polar solvents may, in some instances, dissolve some of the reaction components. It is to be further understood other polar solvents that will not deleteriously affect the other components may be used in combination with water.

The water may be mixed, for example, with a single surfactant. In another example, the water may be mixed with a combination of surfactants. In either case, the surfactant(s) is/are selected from ionic and/or nonionic surfactants. In cases where the continuous phase CP includes a combination of surfactants, the surfactants may be selected such that the hydrophilic-lipophilic balance (HLB) leads to preferential migration of the surfactants to the interface between the continuous phase CP and the discontinuous phase DP, while maintaining the cloud point below the polymerization temperature. Some non-limiting examples of suitable ionic surfactants include sulfate-based surfactants (e.g., sodium dodecylsulfate, sodium alkyl sulphate (e.g., EMPICOL® LXV/N)), sulfonate-based surfactants (e.g., diphenyloxide sulfonate, alkyldiphenyloxide disulfonate (e.g., DOWFAX® 30599)), carboxylate-based surfactants, and stearates. Some non-limiting examples of suitable non-ionic surfactants include polyethylene oxide surfactants such as, e.g., TERGITOL® 15-S-5 and TERGITOL® 15-S-30 (Dow Chemical Company, Midland, Mich.), EMULAN® (BASF Corp., Florham Park, N.J.)), LUTENSOL® (BASF Corp.), and IGEPAL® (Rhodia Inc., Cranbury, N.J.).

Dispersing the discontinuous phase DP into the continuous phase CP may be accomplished via any suitable method, where the selection of such method depends, at least in part, on the viscosity of the phases/dispersion. Examples of suitable dispersion methods include, but are not limited to, ultrasonification, microfluidization, homogenization, and/or combinations thereof. In instances where the nanoparticle cores 12 are in an agglomerated form (even if within a desired size range), certain particle preparation techniques such as ball milling and extrusion may also be used to prepare monodispersed mixture of nanoparticles 12 and monomers M.

In one embodiment, the ionically-charged polyurethane monomers M in the emulsion/dispersion D are polymerized or crosslinked (shown in FIG. 7D), where such polymerization or crosslinking chemically attaches such monomers M to the surface 16 of each nanoparticle core 12, thereby forming ionically-charged, encapsulated colorant nanoparticles 10. In the examples of FIGS. 7A through 7F, such colorant nanoparticles 10 are positively-charged.

In one example, polymerization or crosslinking is initiated by introducing a radical initiator RI into the dispersion D. For water-based encapsulation utilizing acrylate-terminated polyurethane cationomers (see, e.g., sequences labeled (4) in FIGS. 4A through 4C), the radical initiator RI is water soluble. One non-limiting example is potassium persulphate (KPS). For water-based encapsulation utilizing NCO-terminated polyurethane cationomers (see FIGS. 3B and 3D where hydroxyl-terminated acrylic monomers are not added prior to the addition of the alkylating agent), polymerization may be catalyzed by quaternary alkyl amines (e.g., TEA) or through the reaction with any compound containing active hydrogen (such as, e.g., primary aliphatic amines, secondary aliphatic amines, primary aromatic amines, primary hydroxyls, secondary hydroxyls, water, carboxylic acids, and/or combinations thereof). Polymerization or crosslinking is accomplished at a temperature ranging from room temperature (such as about 20° C.) to about 100° C. for a predetermined time ranging, e.g., from about 5 hours to about 24 hours. In an example, the polymerizing or crosslinking is accomplished at a temperature ranging from about 50° C. to about 75° C. for a time period ranging from about 5 hours to about 8 hours.

Whether acrylate-terminated polyurethane cationomers or NCO-terminated polyurethane cationomers are used, it is to be understood that acrylic monomers may be added to the reactor $R_2$ during the formation of the emulsion/dispersion D. The acrylic groups of acrylate-terminated polyurethane cationomers (or anionmers) undergo crosslinking or polymerization to form a positively (or negatively) charged encapsulant layer. It is to be understood that if NCO-terminated polyurethane cationomers (or anionomers) are utilized, positively (or negatively) charged polyurethane/polyurea polymers will form.

The encapsulation method described above in conjunction with FIGS. 7A through 7D may also be used for non-polar-based encapsulation. Such non-polar-based encapsulation may be used when the nanoparticle core 12 is hydrophilic (such as, e.g., when such nanoparticles 12 are selected from water-dispersible/polar pigments), and encapsulation of the nanoparticles 12 is accomplished via self-assembly of the reciprocating charges.

Referring back to FIGS. 7A and 7B, in the instant example, the discontinuous phase DP includes a mixture of negatively-charged particles 12 and positively-charged polyurethane monomers. The discontinuous phase may also include additional hydrophilic acrylic resin, such as methacrylic anhydride (MAA). Such discontinuous phase DP is dispersed in the continuous phase CP to form a dispersion D (as shown in FIG. 7C). The continuous phase CP includes an organic, non-polar solvent and at least one surfactant. The non-polar solvent may be selected, for example, from a hydrocarbon such as, e.g., ISOPAR® V containing from about 1g to about 30 g of SOLSPERSE® 19000, or from an oil.

Referring again to FIG. 7D, for hydrocarbon or oil-based encapsulation utilizing acrylate-terminated polyurethane cationomers (see, e.g., sequences labeled (4) in FIGS. 4A through 4C), the radical initiator RI is oil soluble. One non-limiting example is AIBN (i.e., azobisisobutyronitrile). In an example, the AIBN is dissolved in an acrylic monomer, and the solution is incorporated into the reaction vessel $R_2$. For hydrocarbon or oil-based encapsulation utilizing NCO-terminated polyurethane cationomers (see FIGS. 3B and 3D where hydroxyl-terminated acrylic monomers are not added prior to the addition of the alkylating agent), polymerization may be catalyzed by quaternary alkyl amines (e.g., TEA) or through the reaction with any compound containing active hydrogen (such as, e.g., primary aliphatic amines, secondary aliphatic amines, primary aromatic amines, primary hydroxyls, secondary hydroxyls, water, carboxylic acids, and/or combinations thereof).

In the instant example, prior to polymerization or crosslinking, the attraction of the reciprocating charges (i.e., the negatively charged particles 12 and the positively charged monomers M) initiates self-assembly of the particles 12 and the monomers M.

Polymerizing or crosslinking is then accomplished at a temperature ranging from room temperature (such as about 20° C.) to about 100° C. for a predetermined time ranging, e.g., from about 5 hours to about 24 hours. In an example, the polymerizing or crosslinking is accomplished at a temperature ranging from about 50° C. to about 75° C. for a time period ranging from about 5 hours to about 8 hours.

In another embodiment, encapsulation of the nanoparticles 12 may be accomplished without a radical initiator or other polymerization aid. This example is schematically depicted in FIGS. 7A, 7B, 7C, 7E, and 7F, and such method may be used when the discontinuous phase DP depicted in FIG. 7A includes NCO-terminated prepolymers (see sequences (2) in FIGS. 4A through 4C) and NCO-terminated cationomers alone (see FIGS. 3B and 3D). In this embodiment, the encapsulation may be catalyzed directly by the continuous phase CP (e.g., containing a polar solvent, such as water). More specifically, the dispersion D (shown in FIG. 7C) formed by dispersing the discontinuous phase DP into the continuous phase CP (depicted in FIGS. 7A and 7B) is transferred to a reaction vessel $R_3$, which is subsequently heated. Heating initiates polymerization or crosslinking (as shown in FIGS. 7E and 7F). In a non-limiting example, the reaction temperature ranges from about 20° C. to about 100° C., and the time for heating ranges from about 5 hours to about 24 hours. In another example, the reaction temperature ranges from about 60° C. to about 80° C., and the time for heating ranges from about 5 hours to about 24 hours. In yet another example, the reaction temperature is about 55° C. and the reaction time ranges from about 5 hours to about 8 hours.

It is to be understood that the encapsulated nanoparticles 10 formed by the embodiments/examples of the method described herein in conjunction with the FIG. 7 series are ionically-charged. More specifically, the polyurethane ionomer imparts localized charges on the surface 16 of the nanoparticle cores 12. In a non-limiting example, the charged surface 16 has an electric surface charge ranging from about 1 $\mu C/cm^2$ to about 200 $\mu C/cm^2$. Although the examples discussed in FIGS. 7A through 7C form positively-charged, encapsulated nanoparticles 10, it is to be understood that such embodiments/examples may also be used to form negatively-charged, encapsulated nanoparticles 10. For instance, such negatively-charged particles may be formed using positively-charged nanoparticle cores 12 and polyurethane anionomers (either NCO-terminated (see sequence (2) of FIGS. 5A and 5B) or acrylate-terminated (see sequence (4) of FIGS. 5A and 5B).

It is further to be understood that the resultant encapsulated nanoparticles 10 are formed from a liquid emulsion that, after polymerization or crosslinking, becomes a solid. Thus, no part of the resultant encapsulated nanoparticles 10 contains a liquid.

Furthermore, the embodiments/examples of the ionically-charged, encapsulated colorant nanoparticles 10 may be used as a colorant in ink compositions for printing. In such cases, the nanoparticles 10 may be filtered (e.g., screened through aluminum sieves) to remove any undesirably large particles or any other undesirable remaining or unreacted emulsion components. The nanoparticles 10 may then be incorporated into the formulation of the ink. In an example, the ink composition includes an ink vehicle, which itself is made up of one or more solvents, perhaps one or more surfactants, and water. In some instances, the ink vehicle further includes additives such as, e.g., biocides, binders, charge directors, or the like. Although the nanoparticles 10 promote dispersion stability when incorporated into the ink composition, in some cases, the ink vehicle includes an additional dispersant to facilitate long-term stability of the ink. In an example, the dispersant is present in the ink composition in an amount ranging from about 20 wt % to about 100 wt % based on the solid content of the nanoparticles 10. In an example, the dispersant is present in an amount ranging from about 5 wt % to about 10 wt % of the total ink composition.

The ink composition further includes the ionically-charged, encapsulated nanoparticles 10 as a colorant, where such nanoparticles 10 are dispersed in the ink vehicle. In an example, the nanoparticles 10 are present in an amount ranging from about 2 wt % to about 6 wt % of the total ink composition.

It is to be understood that the ranges provided herein include the stated range and any value or sub-range within the stated range. For example, an amount ranging from approximately 1 wt % to about 20 wt % should be interpreted to include not only the explicitly recited amount limits of 1 wt % to about 20 wt %, but also to include individual amounts, such as 2 wt %, 3 wt %, 4 wt %, etc., and sub-ranges, such as 5 wt % to 15 wt %, 10 wt % to 20 wt %, etc.

While several embodiments have been described in detail, it will be apparent to those skilled in the art that the disclosed embodiments may be modified. Therefore, the foregoing description is to be considered exemplary rather than limiting.

What is claimed is:

1. A method of forming an ionically-charged, encapsulated colorant nanoparticle, comprising:
    forming in-situ ionically-charged polyurethane monomers;
    forming an emulsion including the ionically-charged polyurethane monomers and colorant nanoparticles; and
    polymerizing or crosslinking the ionically-charged polyurethane monomers in the emulsion, the polymerizing or crosslinking chemically attaching the ionically-charged polyurethane monomers to a surface of the colorant nanoparticle to form an ionically-charged encapsulation layer on the surface;
    wherein prior to forming in-situ the ionically-charged polyurethane monomers, the method further includes tagging a diol or polyol reactant used to form the polyurethane monomers.

2. The method as defined in claim 1 wherein the in-situ forming of the ionically-charged polyurethane monomers is accomplished by:
    reacting, in a single reactor, a basic diol or a polyol with a diisocyanate to form a polyurethane prepolymer; then
    introducing an alkylating agent into the single reactor to impart a cationic charge to the polyurethane prepolymer to form the ionically-charged polyurethane monomers.

3. The method as defined in claim 2, wherein prior to introducing the alkylating agent, the method further comprises:
    introducing a hydroxyethyl (meth)acrylate into the single reactor, the hydroxyethyl (meth)acrylate reacting with the polyurethane prepolymer to form a polyurethane-based di-(meth)acrylate; and then
    introducing the alkylating agent into the single reactor to impart the cationic charge to the polyurethane-based di-(meth)acrylate.

4. The method as defined in claim 2, further comprising controlling at least one of i) a selection of the diol or the polyol, or ii) a stoichiometry of the diol or the polyol and the diisocyanate to obtain the ionically-charged polyurethane monomers including multiple crosslinking sites.

5. The method as defined in claim 1 wherein the in-situ forming of the ionically-charged polyurethane monomers is accomplished by:
    reacting, in a single reactor, an acidic diol or a polyol with a diisocyanate; and
    performing base catalysis to form negatively charged polyurethane prepolymers, wherein the negatively charged polyurethane prepolymers are the ionically-charged polyurethane monomers.

6. The method as defined in claim 5 wherein prior to or subsequent performing the base catalysis, the method further comprises introducing a hydroxyethyl (meth)acrylate into the single reactor.

7. The method as defined in claim 1 wherein the forming of the emulsion includes:
    mixing the ionically-charged polyurethane monomers with the colorant nanoparticle to form a discontinuous phase, the colorant nanoparticle having a surface charge opposite of the ionically-charged polyurethane monomers; and dispersing the discontinuous phase in a continuous phase to form a dispersion, the continuous phase including i) a polar solvent and at least one surfactant, or ii) an organic, non-polar solvent and at least one surfactant.

8. The method as defined in claim 7 wherein the continuous phase includes a polar solvent, and wherein after the forming of the emulsion, the method further comprises initiating the polymerizing or crosslinking of the ionically-charged polyurethane monomers by introducing a radical initiator into the dispersion.

9. The method as defined in claim 7 wherein the continuous phase includes an organic, non-polar solvent, and wherein after the emulsion is formed, the method further comprises initiating the polymerizing or crosslinking of the ionically-charged polyurethane monomers by initiating self-assembly of the ionically-charged polyurethane monomers and the colorant nanoparticle.

10. The method as defined in claim 7 wherein the discontinuous phase includes a colorant nanoparticle-to-polyurethane monomer ratio ranging from about 1:1 to about 1:10.

11. The method as defined in claim 1 wherein the polymerizing or crosslinking is accomplished at a temperature ranging from about 20° C. to about 100° C. for a predetermined time.

12. An ionically-charged, encapsulated colorant nanoparticle, comprising:
a colorant nanoparticle core; and
an ionically-charged encapsulation layer chemically bonded to a surface of the colorant nanoparticle core, the ionically-charged encapsulation layer including a polymerized or crosslinked ionically-charged polyurethane monomer;
wherein:
the ionically-charged encapsulation layer is a continuous layer, and wherein a contact angle of the polymerized or crosslinked ionically-charged polyurethane monomer is less than 80 degrees; or
the ionically-charqed encapsulation layer is a discontinuous layer, and wherein a contact angle of the polymerized or crosslinked ionically-charged polyurethane monomer on the colorant nanoparticle core is 80 degrees or more.

13. The colorant nanoparticle as defined in claim 12 wherein the ionically-charged polyurethane monomers are configured to be formed in-situ from:

reacting, in a single reactor, a basic diol or a polyol with a diisocyanate to form an isocyanate-terminated polyurethane prepolymer; then
introducing a hydroxyethyl (meth)acrylate into the single reactor, the hydroxyethyl (meth)acrylate reacting with the isocyanate-terminated polyurethane prepolymer to form a polyurethane-based di-(meth)acrylate; and then
introducing an alkylating agent into the single reactor to impart a cationic charge to the polyurethane-based di-(meth)acrylate.

14. The colorant nanoparticle as defined in claim 12 wherein the ionically-charged polyurethane monomers are configured to be formed in-situ from:
reacting, in a single reactor, an acidic diol or a polyol with a diisocyanate;
performing base catalysis to form a negatively charged isocyanate-terminated polyurethane prepolymer; and then
introducing a hydroxyethyl (meth)acrylate into the single reactor, the hydroxyethyl (meth)acrylate reacting with the charged isocyanate-terminated polyurethane prepolymer to form a negatively charged polyurethane-based di-(meth)acrylate.

15. The colorant nanoparticle as defined in claim 12 wherein the ionically-charged polyurethane monomers include at least one crosslinking site.

16. The colorant nanoparticle as defined in claim 12 wherein the ionically-charged encapsulation layer is configured to be formed from an emulsion including a discontinuous phase dispersed in a continuous phase, the discontinuous phase including the ionically-charged polyurethane monomers and the colorant nanoparticle core having a surface charge opposite that of the ionically-charged polyurethane monomers, wherein the continuous phase includes an organic, non-polar solvent when the colorant nanoparticle core is hydrophilic, and wherein the continuous phase includes a polar solvent when the colorant nanoparticle core is hydrophobic.

17. The colorant nanoparticle as defined in claim 12 wherein the ionically-charged encapsulation layer is covalently bonded to a surface of the colorant nanoparticle core.

* * * * *

UNITED STATES PATENT AND TRADEMARK OFFICE
CERTIFICATE OF CORRECTION

PATENT NO. : 8,653,185 B2
APPLICATION NO. : 12/771586
DATED : February 18, 2014
INVENTOR(S) : Doris Pik-Yiu Chun et al.

It is certified that error appears in the above-identified patent and that said Letters Patent is hereby corrected as shown below:

In the Claims:

In column 19, line 37, in Claim 12, delete "charqed" an insert -- charged --, therefor.

Signed and Sealed this
Tenth Day of June, 2014

Michelle K. Lee
*Deputy Director of the United States Patent and Trademark Office*